US009228846B2

(12) United States Patent
DeLuca et al.

(10) Patent No.: US 9,228,846 B2
(45) Date of Patent: Jan. 5, 2016

(54) GENERATING ROUTES

(75) Inventors: Lisa Seacat DeLuca, San Francisco, CA (US); Travis M. Grigsby, Austin, TX (US); Soobaek Jang, Hamden, CT (US); Trevor Livingston, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 13/352,927

(22) Filed: Jan. 18, 2012

(65) Prior Publication Data

US 2013/0184982 A1 Jul. 18, 2013

(51) Int. Cl.
G08G 1/123 (2006.01)
G01C 21/34 (2006.01)
G08G 1/0969 (2006.01)

(52) U.S. Cl.
CPC ............ *G01C 21/343* (2013.01); *G08G 1/0969* (2013.01)

(58) Field of Classification Search
USPC ......... 701/532–533, 400, 409–411, 439, 454, 701/428, 461; 707/705, 802, E17.044; 482/8; 340/995.2, 995.27, 995.19, 990, 340/995.1, 995.21; 73/178 R; 445/456.1
See application file for complete search history.

(56) References Cited

U.S. PATENT DOCUMENTS

| | | | | |
|---|---|---|---|---|
| 6,151,552 A | * | 11/2000 | Koizumi | G01C 21/3629 340/988 |
| 6,680,694 B1 | * | 1/2004 | Knockeart et al. | 342/357.31 |
| 6,934,615 B2 | * | 8/2005 | Flann | A01B 69/008 172/2 |
| 7,627,423 B2 | * | 12/2009 | Brooks | 701/433 |
| 7,822,539 B2 | * | 10/2010 | Akiyoshi | G01C 21/343 340/989 |
| 8,346,471 B2 | * | 1/2013 | Coombes et al. | 701/408 |
| 8,386,111 B2 | * | 2/2013 | Cox | B61L 3/225 180/167 |
| 8,712,676 B2 | * | 4/2014 | Hiestermann et al. | 701/119 |
| 8,725,276 B2 | * | 5/2014 | Ellis | A61B 5/1038 700/91 |
| 2004/0193349 A1 | * | 9/2004 | Flann | A01B 69/008 701/50 |
| 2006/0206258 A1 | * | 9/2006 | Brooks | 701/202 |
| 2007/0073480 A1 | * | 3/2007 | Singh | 701/211 |
| 2008/0033633 A1 | * | 2/2008 | Akiyoshi | G01C 21/343 701/418 |
| 2009/0105941 A1 | * | 4/2009 | Johnston et al. | 701/202 |
| 2010/0125411 A1 | * | 5/2010 | Goel | 701/209 |

(Continued)

FOREIGN PATENT DOCUMENTS

CN 101780774 7/2010
EP 2233887 A1 9/2010

(Continued)

OTHER PUBLICATIONS

NAVOPT: Navigator Assisted Vehicular Route OPTimizer; Wooseong Kim; Gerla, M.; Innovative Mobile and Internet Services in Ubiquitous Computing (IMIS), 2011 Fifth International Conference on; Digital Object Identifier: 10.1109/IMIS.2011.36 Publication Year: 2011, pp. 450-455.*

(Continued)

*Primary Examiner* — Cuong H Nguyen
(74) *Attorney, Agent, or Firm* — Schmeiser, Olsen & Watts, LLP; Matthew Chung

(57) ABSTRACT

A method, data processing system and computer program product for generating a route. A beginning location is received. A set of preferences for generating a set of routes is received. A set of routes is generated based upon the set of preferences, wherein each route in the set of routes starts and ends at the beginning location, and wherein at least a portion of a specified route in the set of routes does not overlap any other portion of the specified route in the set of routes.

16 Claims, 5 Drawing Sheets

(56) References Cited

U.S. PATENT DOCUMENTS

| | | | | |
|---|---|---|---|---|
| 2010/0185384 | A1* | 7/2010 | Naito et al. | 701/200 |
| 2012/0015778 | A1* | 1/2012 | Lee et al. | 482/8 |
| 2012/0015779 | A1* | 1/2012 | Powch et al. | 482/9 |
| 2012/0016678 | A1* | 1/2012 | Gruber et al. | 704/275 |
| 2012/0259547 | A1* | 10/2012 | Morlock et al. | 701/533 |

FOREIGN PATENT DOCUMENTS

| | | | | |
|---|---|---|---|---|
| JP | GB 2328744 B | * | 2/2002 | G01C 21/3629 |
| JP | 4555583 B2 | * | 10/2010 | G01C 21/343 |
| WO | WO 2005031263 A1 | * | 4/2005 | G08G 1/0969 |
| WO | 2010111833 A1 | | 10/2010 | |

OTHER PUBLICATIONS

Integrating GPS receivers into consumer mobile electronics; Diaz, M.; MultiMedia, IEEE; vol. 6, Issue: 4; Digital Object Identifier: 10.1109/93.809238; Publication Year: 1999, pp. 88-90.*

Multiobjective route selection for car navigation system using genetic algorithm; Chakraborty, Basabi ; Maeda, T. ; Chakraborty, G. Soft Computing in Industrial Applications, 2005. SMCia/05. Proceedings of the 2005 IEEE Mid-Summer Workshop on; Digital Object Identifier: 10.1109/SMCIA.2005.1466971; Publication Year: 2005, pp. 190-195.*

Comparative benefits of various automotive navigation and routing technologies; Sweeney, L.E., Jr.; Position Location and Navigation Symposium, 1996., IEEE 1996; Digital Object Identifier: 10.1109/PLANS.1996.509108; Publication Year: 1996, pp. 415-421.*

A navigation route based minimum dominating set algorithm in VANETs;Hui Cao; Weigang Wu; Yishun Chen; Smart Computing Workshops (SMARTCOMP Workshops), 2014 International Conference on; Year: 2014; pp. 71-76, DOI: 10.1109/SMARTCOMP-W.2014.7046670.*

Extended Floating Car Data System: Experimental Results and Application for a Hybrid Route Level of Service; Vinagre Diaz, J.J.et al.; Intelligent Transportation Systems, IEEE Transactions on; Year: 2012, vol. 13, Issue: 1; pp. 25-35; 25-35, DOI: 10.1109/TITS.2011.2178834.*

GROOV: A geographic routing over VANETs and its performance evaluation; Dhurandher, S.K.; Obaidat, M.S.; Bhardwaj, D.; Garg, A.; Global Communications Conference (GLOBECOM), 2012 IEEE; Year: 2012; pp. 1670-1675, DOI: 10.1109/GLOCOM.2012.6503354.*

Improving Vehicle Fleet Fuel Economy via Learning Fuel-Efficient Driving Behaviors; Linda, O.; Manic, M. Human System Interactions (HSI), 2012 5th International Conference on; Year: 2012; pp. 137-143, DOI: 10.1109/HSI.2012.28.*

"Jogging Route Calculator," halfbakery.com, Jan. 2005, 4 pages, accessed Aug. 23, 2011 http://www.halfbakery.com/idea/jogging_20route_20calculator#1105981210.

"Google maps," google.com, copyright 2011, 1 page, accessed Aug. 23, 2011 https://maps.google.com/maps?hl=en&tab=ll.

Chinese Office Action, END920110185CN1, 10037, Jul. 24, 2015, 13 pages.

* cited by examiner

GENERATING ROUTES

BACKGROUND

1. Field

The present disclosure relates generally to generating routes and in particular to a method and system for generating routes based upon preferences. Still more particularly, the present disclosure relates to a method and system for generating routes, wherein the routes start and end at a beginning location, and wherein at least a portion of each route does not overlap with any other portion of the route.

2. Description of the Related Art

Today, global positioning systems and mapping software are often used to help travelers follow routes to destinations. For example, a mobile device user may enter a desired destination into the mobile device in order to find out how to arrive at the destination. The mobile device then generates a route for the user to follow, based upon the desired destination and the current location of the user.

A traveler might desire a route that eventually returns the traveler to the beginning location. For example, a traveler may decide to visit a monument or a park, and then return after a certain amount of time. The traveler may decide to return along the same route or along a different route. For example, there may be one or more additional locations or points of interest (poi) that the traveler may wish to visit that were not along the route that was used to arrive at the traveler's current location.

SUMMARY

The different illustrative embodiments provide a method, data processing system, and computer program product for generating a route. A beginning location is received. A set of preferences for generating a set of routes is received. A set of routes is generated based upon the set of preferences, wherein each route in the set of routes starts and ends at the beginning location, and wherein at least a portion of a specified route in the set of routes does not overlap any other portion of the specified route in the set of routes.

DETAILED DESCRIPTION

Figure 1:
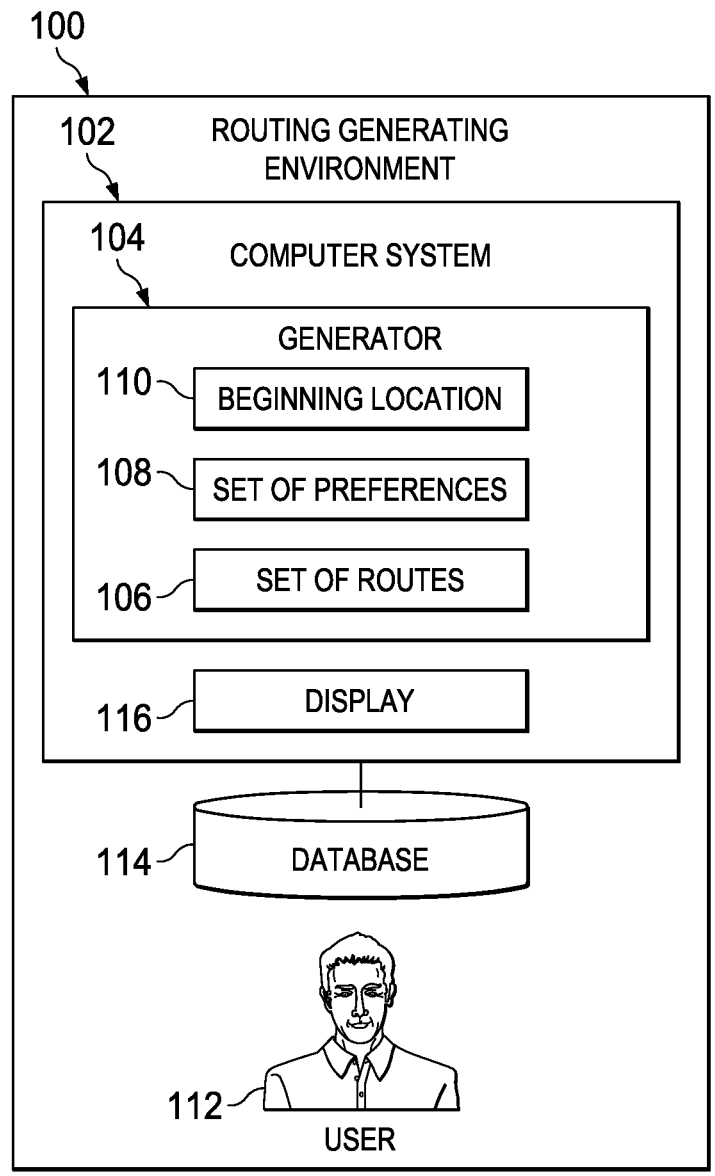
FIG. 1 is an illustration of a route generating environment in which illustrative embodiments may be implemented.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into that account that mapping software and mapping devices are often used to help travelers follow routes to destinations. The different illustrative embodiments recognize and take into account that travelers might desire to return to a starting location after traveling to one or more locations. The different illustrative embodiments recognize and take into account that generating routes to a destination that have a different return path may be desirable.

Thus, the different illustrative embodiments provide method, data processing system, and computer program product for generating a route. A beginning location is received. A set of preferences for generating a set of routes is received. A set of routes is generated based upon the set of preferences, wherein each route in the set of routes starts and ends at the beginning location, and wherein at least a portion of a specified route in the set of routes does not overlap any other portion of the specified route in the set of routes. As used herein, "set of" refers to "one or more." For example, a set of routes is one or more routes and a set of preferences is one or more preferences.

With reference to FIG. 1 route generating environment 100 is depicted in accordance with an illustrative embodiment. As depicted, route generating environment 100 is an example of components in which the illustrative embodiments may be implemented.

In the depicted example, computer system 102 comprises generator 104. Generator 104 generates set of routes 106 based upon set of preferences 108. Each route in set of routes 106 starts and ends at beginning location 110. At least a portion of a specified route in set of routes 106 does not overlap any other portion of the specified route. A particular portion of a route does not overlap any other portion of the route if the particular portion of the route does not go through the same location as any other portion of the route. For example, a route that starts on the shore of a lake and follows along the shore of the lake until returning to the starting point does not have a portion that overlaps any other portion. A route that starts at a first house, goes 5 blocks north to a second house, and then returns 5 blocks south along the same path that was used to arrive at the first house overlaps at every portion of the route because the same path is used for both directions of the route. However, if a route starts at the first house, goes 5 blocks north, returns 4 blocks south, but then goes east one block, south one block, and finally west one block to arrive at the first house, then the route would have at least a portion that does not overlap any other portion.

In this illustrative example, generator 104 receives preferences 108 and beginning location 110 from user 112. For example, user 112 of route generating software may provide preferences 108 and beginning location 110 to generator 104. Preferences 108 and beginning location 110 may be provided to generator 104 via a touch panel, keyboard input, voice input, and any other input suitable for providing preferences 108 and beginning location 110 to generator 104. In some illustrative examples, preferences 108 and beginning location 110 may be received from another computer system or may already be stored in computer system 102 or another data source.

Generator 104 may be software running on computer system 102. In some illustrative examples, generator 104 may be hardware. In the depicted example, computer system 102 is hardware that may comprise one or more computers, server computers, client computers, personal devices, or any other systems capable of running program code.

In this illustrative example, computer system 102 communicates with database 114 via a communications medium. Examples of a communications medium that may be used include, for example a network, wire and wireless transmission of information. Database 114 can include information used by generator 104 to generate set of routes 106. For example, database 114 may include information about locations, streets, cities, landmarks, points of interest, social interests, available transportation, and any other type of information suitable for being used to generate set of routes 106. Furthermore, database 114 may include one or more separate databases that exist on one or more separate computer systems.

In this illustrative example, display 116 displays set of routes 106 to user 112. Display 114 can be a panel, screen, monitor, and any other device suitable for displaying set of routes 106 to user 112. For example, user 112 may view set of routes 106 on a graphical display of a mobile communications device.

Figure 2:
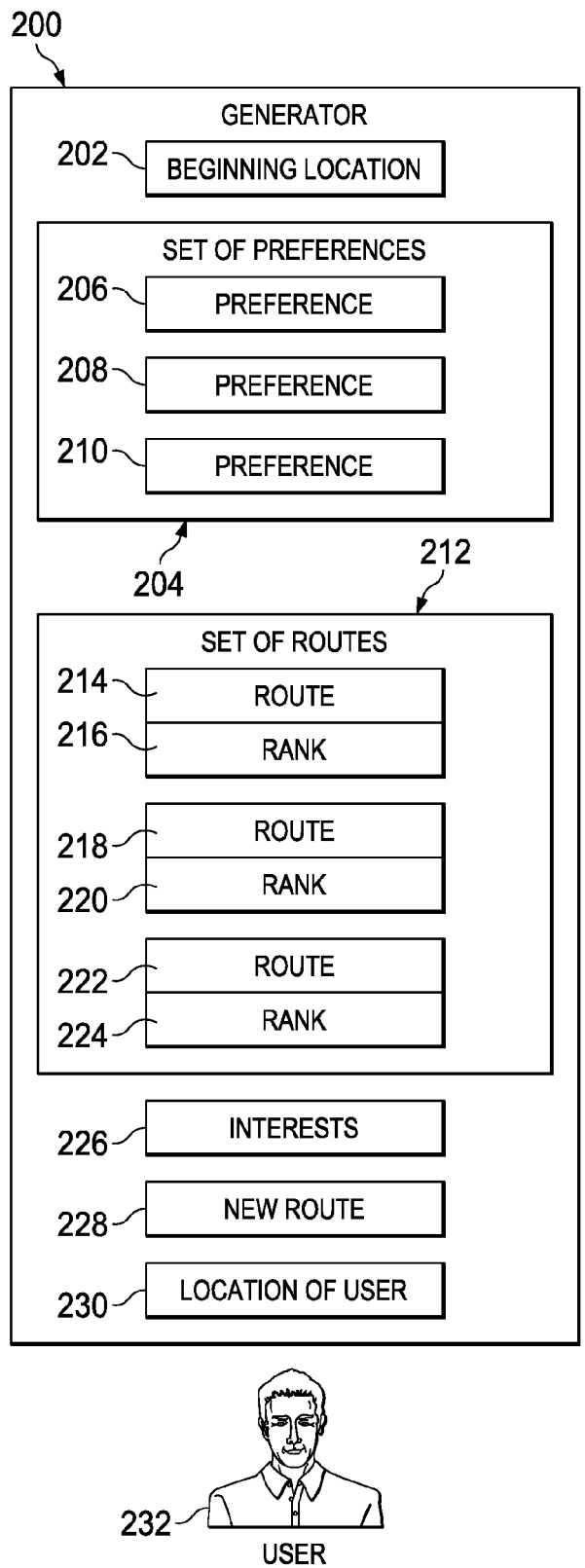
FIG. 2 is an illustration of a generator in which illustrative embodiments may be implemented.

With reference now to FIG. 2, an illustration of generator 200 is depicted in accordance with an illustrative embodiment. Generator 200 is an example of generator 104 in route generating environment 100 of FIG. 1.

In the depicted example, generator 200 includes beginning location 202. Generator 200 also includes set of preferences 204, which further includes preference 206, preference 208, and preference 210. Generator 200 also includes set of routes 212, which further includes route 214, rank 216, route 218, rank 220, route 222, and rank 224. Generator 200 also includes interests 226, new route 228, and location of user 230.

In the depicted example, user 232 provides preference 206, preference 208, and preference 210. In the depicted example, preference 206 is a distance, preference 208 is a location to be included along a route, and preference 210 is a change in elevation. A preference may be a distance, location to be included along a route, change in elevation, number of turns, type of surface, mode of transportation, and any other preference suitable for using in generating a route. Furthermore, mode of transportation may be walking, jogging, running, bicycle, skating, motorcycle, public transportation, and any other mode of transportation suitable for generating a route.

For example, preference 206 may be 3 miles, preference 208 may be a particular park to be included along the route, and preference 210 may be 50 feet. Generator 200 generates route 214, route 218, and route 222 based upon preference 206, preference 208, and preference 210, wherein the route starts and ends at beginning location 202. In some illustrative examples, beginning location 202 may be received form user 232. In some illustrative examples, beginning location 202 may be received from another computer system or may already be stored in computer system 102 or another data source. In some illustrative examples, beginning location 202 may be determined for example, but not limited to, based upon a global positioning system, triangulation, or browser based location services.

In the depicted example, each route in set of routes 212 is ranked based upon set of preferences 204. Therefore, route 214, route 218, and route 222 may be ranked based upon preference 206, preference 208, and preference 210. In some illustrative examples, a route that has the most matches for each preference has the highest rank. The route with the next most matches has the second highest rank, and so forth. In some illustrative examples, a route that has the closest matches for each preference has the highest rank. The route with the next closest matches has the second highest rank, and so forth. In some illustrative examples, a value is assigned for each rank in set of routes 212. The value may be numerical or any other value suitable for representing a degree of match of each preference to the corresponding route.

In some illustrative examples, each preference may be required or not required. For example, preference 206 may be a required 3 miles, preference 208 may be a particular park is required to be included along the route, and preference 210 may be 50 feet, but not required. Route 214 may be 3.1 miles with 51 feet of elevation change, route 218 may be 3.5 miles with 47 feet of elevation change, and route 222 may be 2 miles with 25 feet of elevation change. In this example, rank 216 of route 214 may be "1," rank 220 of route 218 may be "2," and rank 224 of route 222 may be "3."

Generator 200 may also generate routes based upon interests 226. For example, user 232 may enter an interest of "lakes." Generator may then generate routes that go near one or more lakes. Interests 226 may include hobbies, food and drink preferences, social interests, locations, people, animals, and any other topic suitable for being an interest of user 232.

In some illustrative examples, location of user 230 is the current location of user 232. Location of user 230 may be provided by a global positioning system. For example, user 232 may have a device that is located by a global positioning system. In some illustrative examples, user 232 may provide location of user 232.

In some illustrative examples, during traversal of a route, if generator 200 determines that location of user 230 and a route that the user is currently following does not satisfy set of preferences 204, new route 228 from location of user 230 to beginning location 202 is generated based on location of user 230 and set of preferences 204. In some illustrative examples, generator 200 generates new route 228 from location of user 230 to beginning location 202 is generated based on location of user 230 and set of preferences 204 when generator determines that user 232 was following a route, but is no longer on the route.

The illustration of route generating environment 100 in FIG. 1 and generator 200 in FIG. 2 is not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, database 114 may be located within computer system 102. In some illustrative examples, database 114 is replaced with one of a plurality of databases, each of which may be accessed through a wire and wireless connection. Furthermore, display 116 may be located on a different computer system than computer system 102. For example, computer system 102 may transmit information through wire and wireless connections to a remote computer system that includes display 116 in order to display set of routes 106. Therefore, display 116 may be remotely located from computer system 102.

Figure 3:
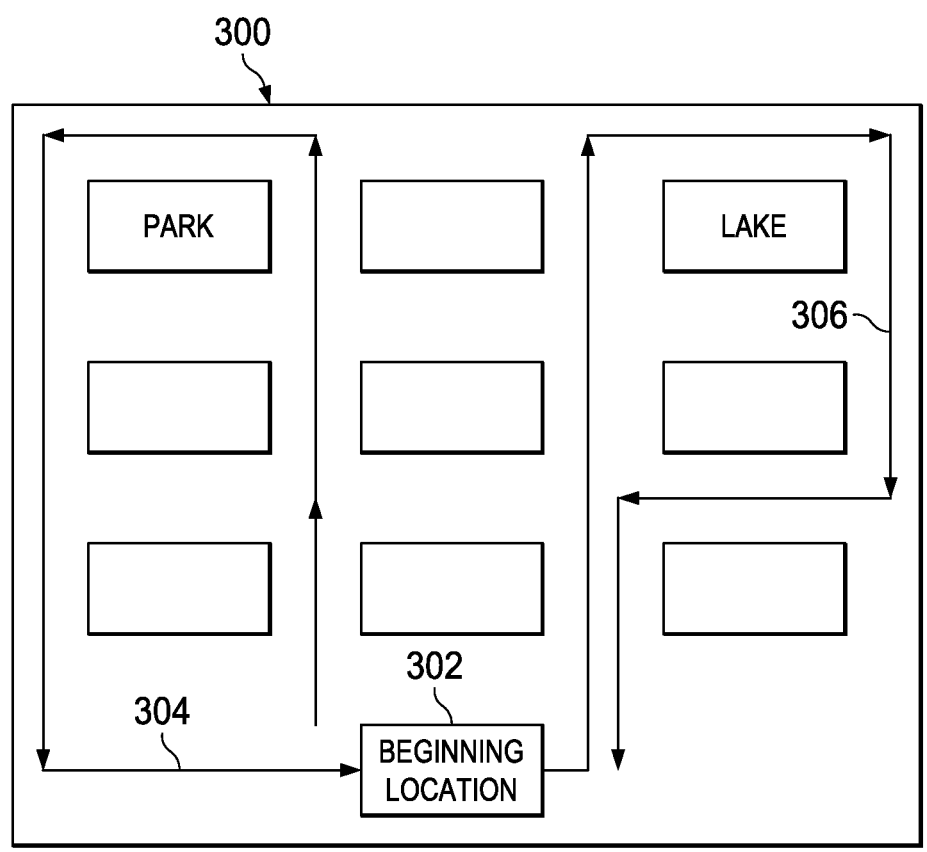
FIG. 3 is an illustration of a display in accordance with an illustrative embodiment.

With reference now to FIG. 3, an illustration of a display 300 of a set of routes is depicted in accordance with an illustrative embodiment. The display 300 illustrated in FIG. 3 may be implemented on a display, such as display 116 in FIG. 1. In some illustrative examples, beginning location 302 may be a current location of user 112. Route 304 and route 306 are examples of routes in set of routes 106 that are displayed on display 112 for user 112. In the depicted example, user 112 entered a preference of 3 miles, and generator 104 generated two routes that are each 3 miles. User 112 may decide to take route 304 to go near a park or to take route 306 to go near a lake.

Figure 4:
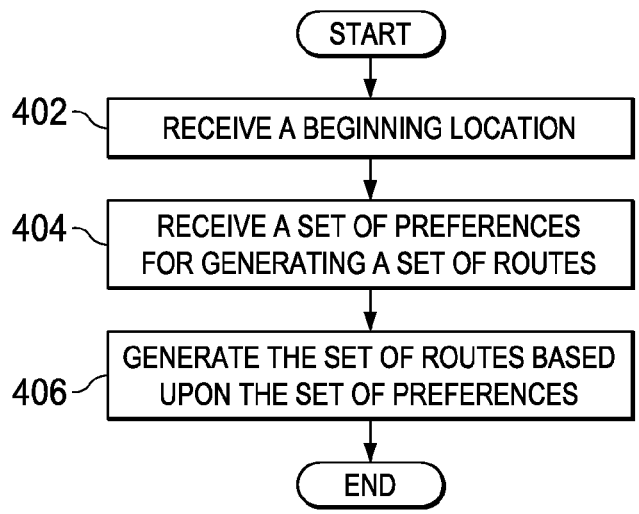
FIG. 4 is an illustration of a flowchart of a process for generating a route in accordance with an illustrative embodiment

With reference now to FIG. 4, an illustration of a flowchart of generating routes is depicted in accordance with an illustrative embodiment. The process illustrated in FIG. 4 may be implemented in a route generating environment, such as route generating environment 100 in FIG. 1.

The process begins by receiving a beginning location 110 (step 402). The process receives a set of preferences 108 for generating a set of routes 106 (step 404). The process generates the set of routes 106 based upon the set of preferences 108 (step 406). Each route in the set of routes 106 starts and ends at the beginning location 110. At least a portion of a specified route in the set of routes 106 does not overlap any other portion of the specified route in the set of routes 106. Thereafter, the process terminates.

Figure 5:
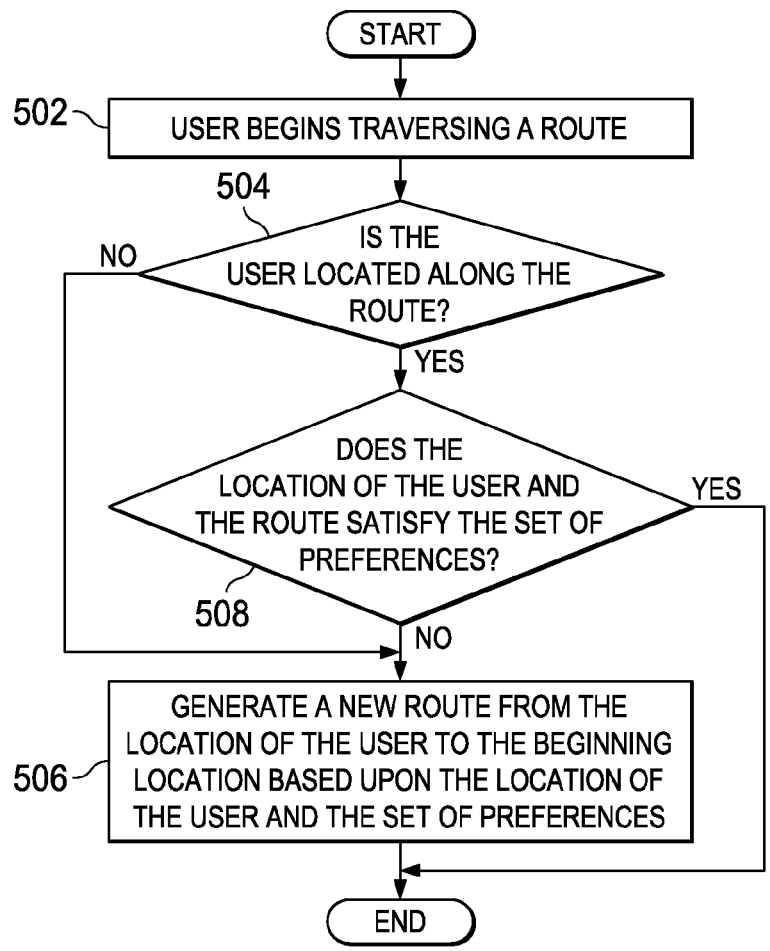
FIG. 5 is an illustration of a flowchart of a process for generating a route in accordance with an illustrative embodiment.

With reference now to FIG. 5, an illustration of a flowchart of a process for generating routes is depicted in accordance with an illustrative embodiment. The process illustrated in FIG. 5 may be implemented in a route generating environment, such as route generating environment 100 in FIG. 1.

The process begins by a user 112 traversing a route (step 502). The process determines whether the user 112 is located along the route (step 504). Responsive to determining that the user 112 is not located along the route, the process generates a new route from the location of the user 112 to the beginning location 110 based upon the location of the user 112 and a set of preferences 108 (step 506). Thereafter, the process terminates.

Returning now to step 504, responsive to determining that the user 112 is located along the route, the process determines whether the location of the user 112 and the route satisfy the set of preferences 108 (step 508). Responsive to determining that the location of the user 112 and the route do not satisfy the set of preferences 108, the process generates a new route from the location of the user 112 to the beginning location 110 based upon the location of the user 112 and a set of preferences 108 (step 506). Thereafter, the process terminates. Returning now to step 508, responsive to determining that the location of the user 112 and the route satisfy the set of preferences 108, the process terminates.

Figure 6:
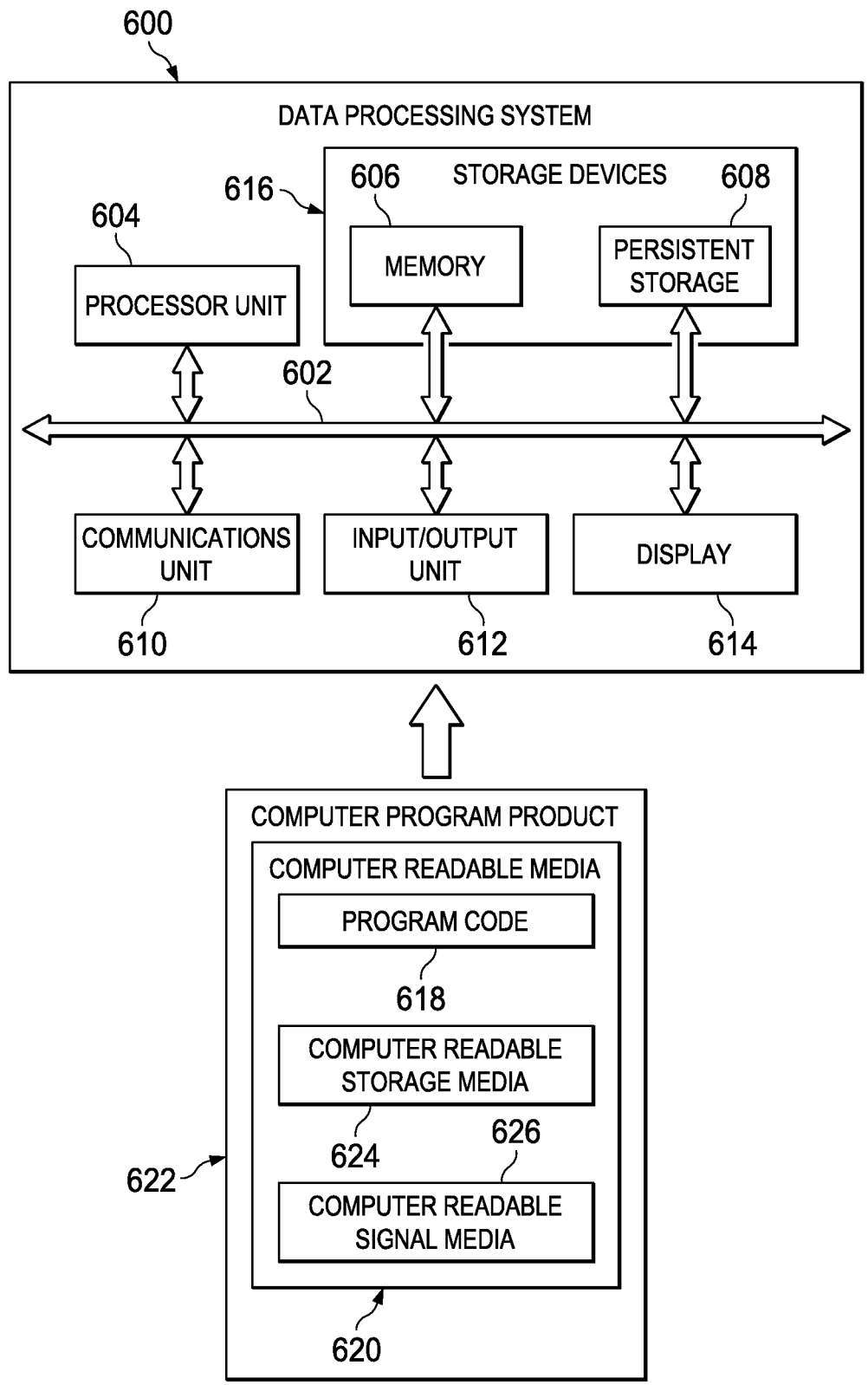
FIG. 6 is an illustration of a data processing system in accordance with an illustrative embodiment.

Turning now to FIG. 6, an illustration of a data processing system is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614. Data processing system 600 is an example of one implementation for computer system 102 in FIG. 1.

Processor unit 604 serves to run instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 or run by processor unit 604. The processes of the different embodiments may be performed by processor unit 604 using computer implemented instructions, which may be located in a memory, such as memory 606.

These instructions are referred to as program code, computer usable program code, or computer readable program code that may be read and run by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 and run by processor unit 604. Program code 618 and computer readable media 620 form computer program product 622 in these examples. In one example, computer readable media 620 may be computer readable storage media 624 or computer readable signal media 626. Computer readable storage media 624 may include storage devices, such as, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage device, such as a hard drive, a thumb drive, or a flash memory, that is connected to data processing system 600. In some instances, computer readable storage media 624 may not be removable from data processing system 600. In these illustrative examples, computer readable storage media 624 is a non-transitory computer readable storage medium.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

Program code 618 may be downloaded over a network from a remote data processing system to computer readable storage media 624 in data processing system 600. Furthermore, data processing system 600 may be a server data processing system, and program code 618 may be downloaded over the network to the remote data processing system for use in another computer readable storage media in the remote data processing system.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for generating a route. A beginning location is received. A set of preferences for generating a set of routes is received. A set of routes is generated based upon the set of preferences, wherein each route in the set of routes starts and ends at the beginning location, and wherein at least a portion of a specified route in the set of routes does not overlap any other portion of the specified route in the set of routes.

One or more of the illustrative embodiments generate routes based on a beginning location and a set of preferences. The illustrative embodiments may provide an effective process for generating routes that allow a user to return to a starting location. These results may save time because a user will not have to spend time exploring an area to determine routes that meet the user's preferences.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for generating routes, the method comprising:

receiving, by one or more processors, a beginning location from a global positioning system (GPS);

receiving, by the one or more processors, a set of preferences for generating a set of loop routes, wherein the set of loop routes comprises at least two different loop routes, wherein each loop route is a geographical route along which a traveler may travel, wherein the set of preferences comprises a location to be included along the route, a number of turns, a type of surface, and a type of transportation selected from the group consisting of bicycle, skating, motorcycle, scooter, automobile, and boat; and responsive to receiving the set of preferences, generating, by the one or more processors, the set of loop routes based upon the set of preferences, wherein each loop route in the generated set of route loops has been generated based upon all preferences in the set of preferences, wherein each loop route of the set of loop routes starts and ends at the beginning location, and wherein at least a portion of a specified loop route of the set of loop routes does not overlap any other portion of the specified loop route.

2. The method of claim 1, further comprising:

ranking, by the one or more processors, each loop route of the set of loop routes based on a degree of match between each route loop and each preference of the set of preferences.

3. The method of claim 2, wherein said ranking is based on the most matches between each route loop and the preference of the set of preferences.

4. The method of claim 2, wherein said ranking is based on the closest matches between each route loop and the preference of the set of preferences.

5. The method of claim 1, wherein type of transportation is boat.

6. A computer program product for generating routes comprising:

a computer readable storage device;

program code, stored on the computer readable storage device, which when executed by a computer processor, performs the steps of:

receiving a beginning location from a global positioning system (GPS);

receiving a set of preferences for generating a set of loop routes, wherein the set of loop routes comprises at least two different loop routes, wherein each loop route is a geographical route along which a traveler may travel, wherein the set of preferences comprises at least two different preferences, and wherein each preference of the set of preferences is selected from the group consisting of a distance, a travel time, a location to be included along the route, a number of turns, a change in elevation, a type of surface, and a type of transportation; and responsive to receiving the set of preferences, generating the set of loop routes based upon the set of preferences, wherein each loop route in the set of loop routes starts and ends at the beginning location, and wherein at least a portion of a specified loop route of the set of loop routes does not overlap any other portion of the specified loop route.

7. The computer program product of claim 6, wherein the program code further performs the steps of:

ranking each loop route of the set of loop routes based on a degree of match between each route loop and each preference of the set of preferences.

8. The computer program product of claim 6, wherein receiving the set of preferences comprises the type of surface and the location to be included along the loop route.

9. The computer program product of claim 6, further comprising: during traversal of one loop route of the set of loop routes by a user, generating a new route from a location of the user to the beginning location based upon the location of the user and the set of preferences in response to determining that the location of the user and the one loop route of the set of loop routes does not satisfy the set of preferences.

10. The computer program product of claim 6, wherein the set of preferences comprises a location to be included along the route, a number of turns, a type of surface, and a type of transportation selected from the group consisting of bicycle, skating, motorcycle, scooter, automobile, and boat, and wherein each loop route in the generated set of route loops is based upon all preferences in the set of preferences.

11. The method of claim 1, further comprising:

during traversal of one loop route of the set of loop routes by a user, generating, by the one or more processors, a new route from a location of the user to the beginning location based upon the location of the user and the set of preferences in response to a determination that the location of the user and the one loop route of the set of loop routes does not satisfy the set of preferences.

12. The method of claim 1, further comprising:

after a user begins traversing one loop route of the set of loop routes and a location of the user is no longer along the one loop route of the set of loop routes, generating, by the one or more processors, a new route from a location of the user to the beginning location based upon the location of the user and the set of preferences.

13. A data processing computer system for generating routes comprising:

a bus;
a communications unit connected to the bus;
a global positioning system (GPS);
a storage device connected to the bus, wherein the storage device stores program code; and
a processor unit connected to the bus, wherein the processor unit is configured to run the program code:
to receive a beginning location from the GPS;
to receive a set of preferences for generating a set of loop routes, wherein the set of loop routes comprises at least two different loop routes, wherein each loop route is a geographical route along which a traveler may travel, wherein the set of preferences comprises a location to be included along the route, a number of turns, a type of surface, and a type of transportation selected from the group consisting of bicycle, skating, motorcycle, scooter, automobile, and boat; and
responsive to receiving the set of preferences, to generate the set of loop routes based upon the set of preferences, wherein each loop route in the generated set of route loops has been generated based upon all preferences in the set of preferences, wherein each loop route of the set of loop routes starts and ends at the beginning location, and wherein at least a portion of a specified loop route of the set of loop routes does not overlap any other portion of the specified loop route.

14. The data processing computer system of claim 13, wherein the processor unit is further configured to run the program code to rank each loop route of the set of loop routes based on a degree of match between each route loop and each preference of the set of preferences.

15. The data processing computer system of claim 13, wherein the processor unit is further configured to run the program code to, during traversal of one loop route of the set of loop routes by a user, generate a new route from a location of the user to the beginning location based upon the location of the user and the set of preferences in response to determining that the location of the user and the one loop route of the set of loop routes does not satisfy the set of preferences.

16. The data processing computer system of claim 13, wherein the processor unit is further configured to run the program code to, after a user begins traversing one loop route of the set of loop routes and a location of the user is no longer along the one loop route of the set of loop routes, generate a new route from a location of the user to the beginning location based upon the location of the user and the set of preferences.

* * * * *